(12) United States Patent
Ortel

(10) Patent No.: US 8,498,389 B2
(45) Date of Patent: Jul. 30, 2013

(54) FACILITATION OF A CONFERENCE CALL

(75) Inventor: William Charles Gormley Ortel, New York, NY (US)

(73) Assignee: Verizon Services Corp., Ashburn, VA (US)

(*) Notice: Subject to any disclaimer, the term of this patent is extended or adjusted under 35 U.S.C. 154(b) by 693 days.

(21) Appl. No.: 12/470,319

(22) Filed: May 21, 2009

(65) Prior Publication Data

US 2011/0069140 A1    Mar. 24, 2011

Related U.S. Application Data

(63) Continuation of application No. 11/129,253, filed on May 13, 2005, now Pat. No. 7,539,290, and a continuation of application No. 10/290,683, filed on Nov. 8, 2002, now Pat. No. 6,931,113.

(51) Int. Cl.
*H04M 11/00*    (2006.01)

(52) U.S. Cl.
USPC ............... 379/93.21; 379/158; 379/202.01

(58) Field of Classification Search
USPC ............... 379/93.21, 158, 201.01, 203.01, 379/202.01, 88.02; 348/14.08, 14.01, 14.03, 348/14.1, 14.07
See application file for complete search history.

(56) References Cited

U.S. PATENT DOCUMENTS

| | | | |
|---|---|---|---|
| 4,837,804 A | 6/1989 | Akita | |
| 5,450,481 A | 9/1995 | Penzias | |
| 6,100,882 A | 8/2000 | Sharman et al. | |
| 6,192,342 B1 | 2/2001 | Akst | |
| 6,304,648 B1 * | 10/2001 | Chang | 379/202.01 |
| 6,853,716 B1 * | 2/2005 | Shaffer et al. | 379/202.01 |
| 7,266,189 B1 | 9/2007 | Day | |
| 2003/0081749 A1 | 5/2003 | Berstis | |
| 2003/0081750 A1 | 5/2003 | Berstis | |
| 2003/0081751 A1 | 5/2003 | Berstis | |
| 2003/0125954 A1 | 7/2003 | Bradley et al. | |
| 2003/0158900 A1 | 8/2003 | Santos | |

FOREIGN PATENT DOCUMENTS

| | | |
|---|---|---|
| EP | 0935378 | 8/1999 |
| JP | 3157084 | 6/1991 |
| WO | WO-01/28214 | 4/2001 |

OTHER PUBLICATIONS

Baldis, "Effects of Spatial Audio on Communication During Desktop Conferencing," Thesis Master of Science in Engineering, University of Washington, 25 pages, Copyright 1998.

* cited by examiner

*Primary Examiner* — Olisa Anwah

(57) ABSTRACT

There is provided a system for facilitating a conference call. The system includes a module to generate a real-time voiceprint from a voice input of a participant in the conference call, and a module to provide information indicative of the participant based on the real-time voiceprint.

20 Claims, 5 Drawing Sheets

FACILITATION OF A CONFERENCE CALL

CROSS REFERENCE TO RELATED APPLICATIONS

This patent application is a continuation application of previously-filed, parent application Ser. No. 11/129,253, filed May 13, 2005, which is scheduled to issue on May 26, 2009 as U.S. Pat. No. 7,539,290 and which is titled: "FACILITATION OF A CONFERENCE CALL." The parent application is, in turn, a continuation of grandparent patent application Ser. No. 10/290,683, filed Nov. 8, 2002, which issued on Aug. 16, 2005 as U.S. Pat. No. 6,931,113 and which is also titled: "FACILITATION OF A CONFERENCE CALL." These applications and patents are hereby incorporated by reference herein in their entireties. Benefits under 35 U.S.C §120 are hereby claimed.

BACKGROUND OF THE INVENTION

1. Field of the Invention

The present invention relates to teleconferencing, and more particularly, to a use of a voiceprint to facilitate a conference call.

2. Description of the Prior Art

Audio conferences via a switched telephone network are in widespread use. The conference may be accomplished by use of a multi-line telephone or by a conference bridge having a telephone number that can be called by all conference participants.

To make sense of a conference call, a participant attempts to keep track of whom the other participants are and, at any given time, who is speaking. Typically, participants introduce themselves at the outset of a conference, furnishing an opportunity for the others to identify them and to learn the unique characteristics of their voices. Thus, participants identify one another by recognition of vocal characteristics such as pitch and accent. Still, it is not unusual during a conference for a listener to ask who has just spoken. This scenario becomes further complicated in a case where the conference includes participants from two or more companies and from various organizations within each company. Also, the conference might be arranged by more than one person, each inviting still more people so that there is no centralized advance knowledge of who has been invited, let alone who will actually be present. Thus, during a conference, it is up to each participant to associate the voices and identities of the others and to categorize their roles.

A video conference provides video as well as audio, but it is not as common as the audio conference because it involves additional expenses for special input, output, and coordinating equipment, and also greater transmission bandwidth. An important role of video is to help a listening participant identify a speaking participant.

Recently, the term "desktop conferencing" has come into use, referring to an audio or a video conference that makes use of personal computers (PC) connected via the Internet. A PC can also be configured to interface with a telephone, and it may provide a platform for hardware and software for special purpose processing, such as voiceprint analysis.

Jessica J. Baldis, "Effects of Spatial Audio on Communication During Desktop Conferencing", M S Thesis, Department of Industrial Engineering, University of Washington, 1998, discusses a history of desktop conferencing and explains the importance of identifying the speaker in audio desktop conferencing. Baldis also describes a system in which binaural audio is transmitted in a manner that makes the voices of different speakers appear to come from different places.

Besides being more complicated and expensive than a basic audio conferencing system, a system that involves either video or "spatial audio" requires all participants in a conference to use compatible special equipment.

U.S. Pat. No. 4,837,804 to Akita, entitled "Telephone Answering Voiceprint Discriminating and Switching Apparatus", describes a voice mail system that employs voiceprint analysis. A voice processing unit and a voice analysis unit work together to receive a voice signal in a telephone call and produce voiceprint parameter data. Thereafter, a comparison unit and a decision unit are employed to determine a routing for the call.

Nevertheless, there is a need for a system that allows a participant in a conference call to better track dialog of other participants, without requiring a video link or special equipment at the site of each participant.

SUMMARY OF THE INVENTION

The present invention is realized in a system that facilitates a conference call by enabling a participant in the conference call to determine and categorize the identities of other participants. It associates a voice of a participant with an identity of the participant, and tracks that identification over the course of the conference. The system directs information to a display for presentation of an image, e.g., a photograph or an icon, to indicate which of the participants is speaking.

The system may also be used in association with a video conferencing system to highlight the participant who is speaking. This arrangement is particularly useful in a case where the video conferencing system does not automatically zoom in on the speaking participant.

An embodiment of the present invention is a system for facilitating a conference call. The system includes a module to generate a real-time voiceprint from a voice input of a participant in the conference call, and a module to provide information indicative of the participant based on the real-time voiceprint.

Another embodiment of the present invention is a system for facilitating a conference call that includes a module to generate a real-time voiceprint from a voice input of a participant in the conference call, and a module to determine whether the real-time voiceprint matches a reference voiceprint.

The present invention can also be embodied as a system for facilitating a conference call that includes a module to generate a first voiceprint from a first voice input during the call and to generate a second voiceprint from a second voice input during the call, and a module to determine whether the second voiceprint matches the first voiceprint.

DESCRIPTION OF THE INVENTION

An embodiment of the present invention is realized in a system referred to herein as a conference visualizer (CV). The CV facilitates a conference call by enabling a participant in the conference call to determine and categorize the identities of other participants. It associates a voice of a participant with an identity of the participant, and tracks that identification over the course of the conference.

During the conference, the CV employs automatic speaker recognition, i.e., a voiceprint, to indicate which of a plurality of participants is speaking. A voiceprint is a numerical measure that, when produced from an audio waveform of spoken dialogue from a speaker, is characteristic of the speaker. The CV includes a display, where a spatial arrangement of information on the display can be controlled to show the roles and relationships of the participants. Thus, the CV helps a participant to more fully follow and understand the conference so as to better participate in the conference. Additionally, the CV can provide a record of dialogue that occurred during the conference and that indicates which of the participants was speaking. Such a record can assist in a preparation of conference notes.

Figure 1:
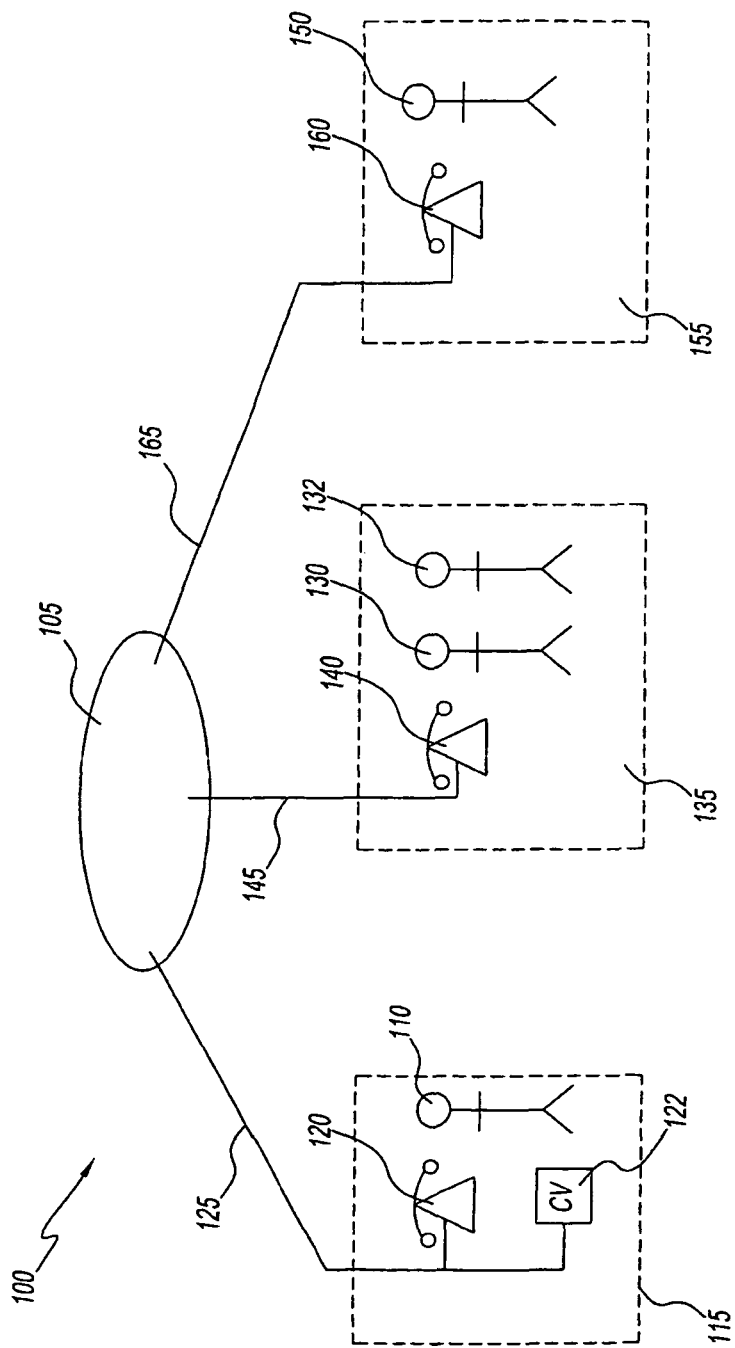
FIG. 1 is a block diagram of a telecommunications system suited for employment of the present invention.

FIG. 1 is a block diagram of a telecommunications system 100 suited for employment of the present invention. System 100 includes a conference bridge 105 coupled via connections 125, 145 and 165 to telephones 120, 140 and 160, respectively, which are in turn located at sites 115, 135 and 155, respectively. Participants 110, 130, 132 and 150 are conducting a conference call. Participant 110 is at site 115 and participant 150 is at site 155. Note that two participants, namely participants 130 and 132, are located at site 135 and that both are using a single telephone, namely telephone 140, as a speaker phone. Site 115 includes an embodiment of the present invention in a CV 122.

An advantage of CV 122 is that it is entirely at the location of participant 110, i.e., site 115, and it does not require any corresponding special equipment at sites 135 and 155. However, the sites 135 and 155 may include CVs 122, if desired. Nevertheless, conference arrangements can be made in a conventional manner, without regard for whether or not a particular site 115, 135 or 155 includes a CV 122.

Figure 2:
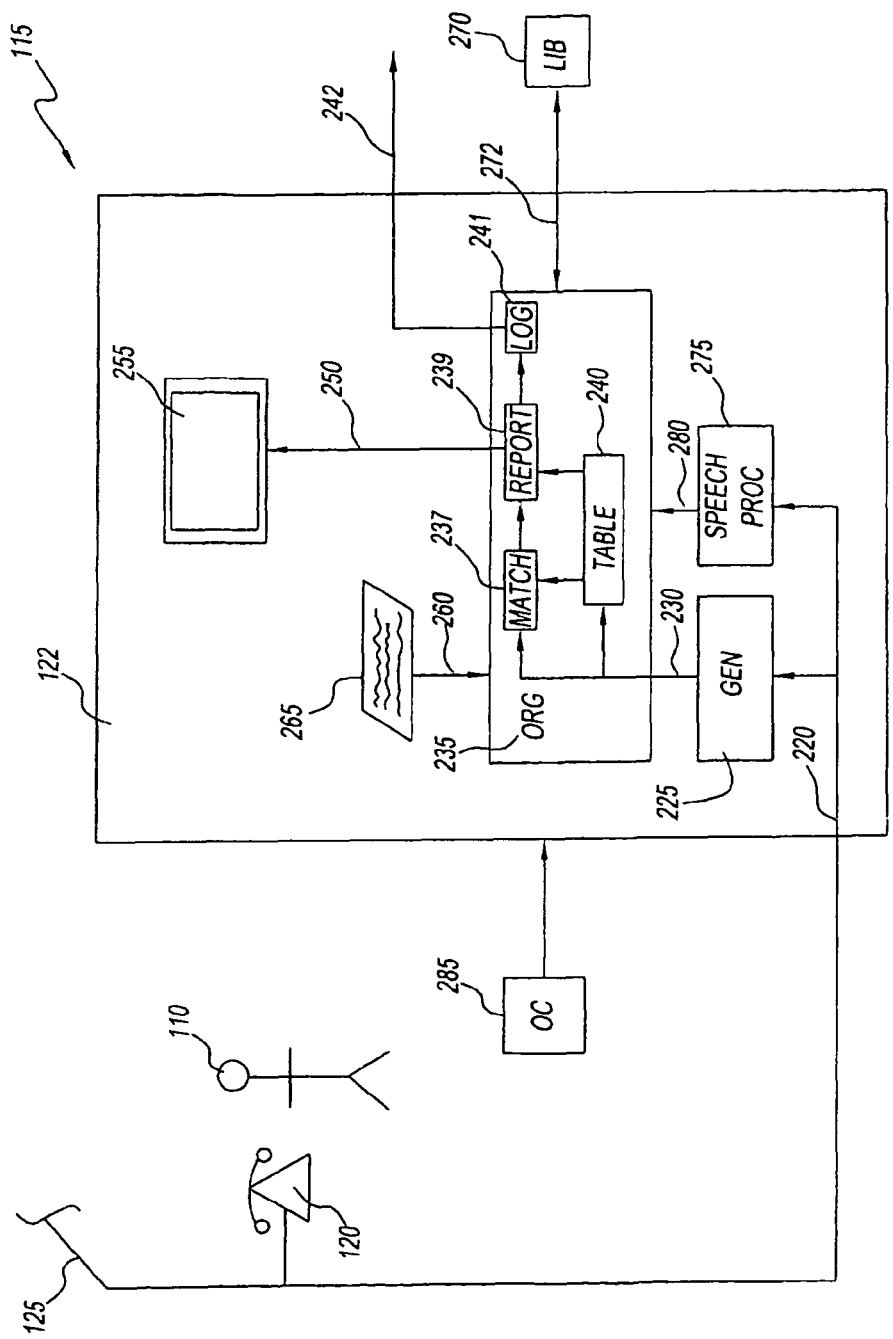
FIG. 2 is a block diagram of a site showing details of a conference visualizer.

FIG. 2 is a block diagram of site 115 showing CV 122 in greater detail. The principal modules of CV 122 are a voiceprint generator 225 and an organizer 235. CV 122 also includes an input device, such as a keyboard 265, and an output device, such as a display 255. The term "module" is used herein to demarcate a functional operation rather a particular physical embodiment of a component. As such, the modules of CV 122 may implemented as stand-alone components, or they may be integrated together.

CV 122 may be implemented in special purpose hardware, that is, hardware specifically designed to perform the functions described herein. Alternatively, CV 122 may be implemented in software and stored in a memory (not shown) for execution by a general-purpose processor (not shown). Suitable examples of such a general-purpose processor include the members of the Sun™ Microsystems family of computer systems, the members of the IBM™ Personal Computer family, or any conventional work-station or graphics computer device.

In the case where CV 122 is implemented in software, instructions for execution of the operations described herein are installed into a memory and executed by a processor. However, the instructions can reside on an external storage media 285 for subsequent loading into the memory. Storage media 285 can be any conventional storage media, including, but not limited to, a floppy disk, a compact disk, a magnetic tape, a read only memory, or an optical storage media. Storage media 285 could also be a random access memory, or other type of electronic storage, located on a remote storage system and coupled to CV 122.

A speaker participating in a conference call generates speech, i.e., spoken dialogue. The speaker may be any of participants 110, 130, 132 or 150. The spoken dialogue is presented to CV 122 as a voice input 220.

Voiceprint generator 225 receives voice input 220 and generates a voiceprint 230 therefrom. Voiceprint 230 is a numerical representation of voice input 220, and is characteristic of the speaker whose spoken dialogue is represented by voice input 220. Ideally, for each of participants 110, 130, 132 and 150, voiceprint generator 225 generates a distinguishable voiceprint 230. When voiceprint generator 225 is actively processing a real-time voice input 220, it produces a real-time voiceprint 230.

Organizer 235 receives voiceprint 230 from voiceprint generator 225. Organizer 235 has two modes of operation, namely a training mode and an analysis mode. In the training mode, organizer 235 receives a first voiceprint 230 and stores it into a participant table, i.e., table 240. A voice print that is stored into table 240 is referred to herein as a reference voiceprint. In the analysis mode, organizer 235 receives a second voiceprint 230, and a matching module 237 determines whether the second voiceprint 230 matches with a reference voiceprint from table 240. Matching module 237 effectively determines whether the second voiceprint 230 matches the first voiceprint 230. Matching module 237 compares the second voiceprint 230 with the reference voiceprints in table 240 and determines a best match. Based on the determination, a reporting module 239 provides information 250 indicative of the participant associated with voiceprint 230. That is, information 250 indicates which of the participants is speaking.

Keyboard 265 enables participant 110 to provide, define and edit descriptive information about the participants in the conference call. Such descriptive information is stored into table 240 in association with the reference voiceprint of the participants. Descriptive information can be any type of information, for example, a participant's name, organizational affiliation, job title, and geographic location. The descriptive information is included as a component of information 250.

Also, via keyboard 265, participant 110 can manually control whether organizer 235 is in analysis mode or in training mode to populate table 240. While taking part in the conference call in the usual manner, participant 110 decides when to activate the training mode by observing that another participant who is of particular interest is speaking.

If desired, participant 110 may disable both of the training mode and the analysis mode, effectively putting CV 122 into a standby mode. The standby is appropriate, for example, during a period when more than one person is speaking or when there is non-speech "background" sound.

Display 255 receives information 250 and shows a representation of the participants. When a particular participant is speaking, and thus providing voice input 220, information 250 indicates this situation in a manner that allows participant 110 to recognize that the particular participant is speaking. For example, display 255 may ordinarily show all of the participants in a muted image, where information 250 causes display 255 to highlight the representation of the participant that is speaking. Alternatively, information 250 may cause display 255 to show an image of only the participant that is currently speaking or that has last spoken. Nonetheless, participant 110 can recognize when different participants start and stop talking.

Figure 3:
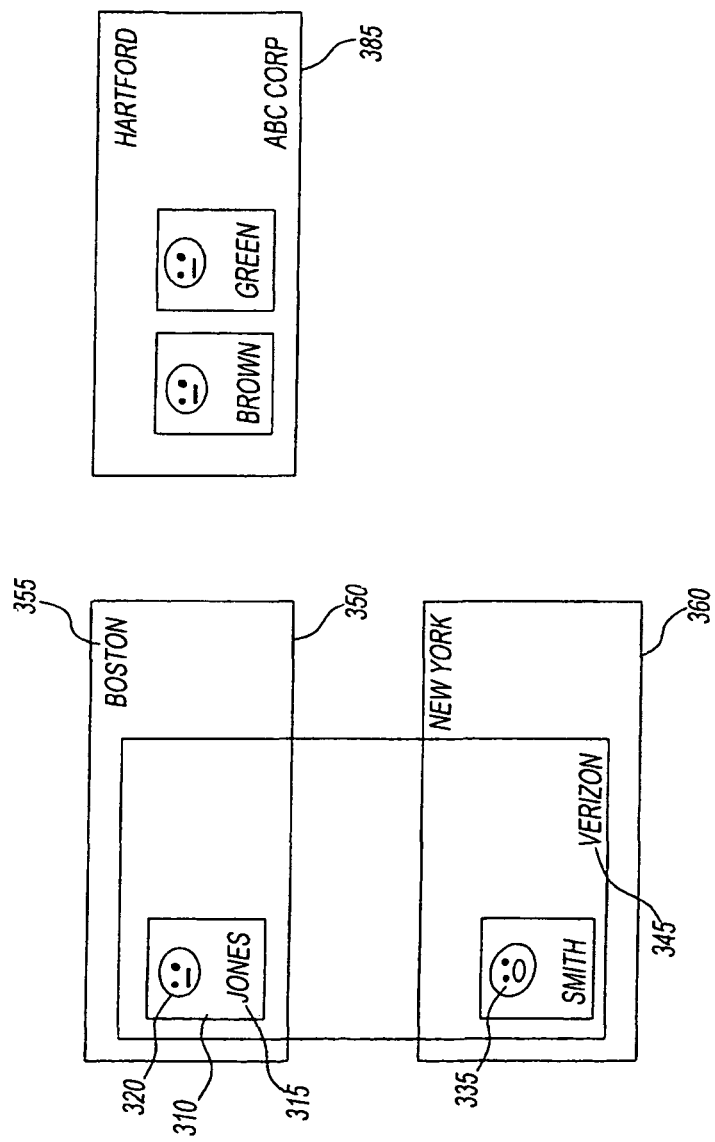
FIG. 3 is an illustration of an exemplary presentation of information on a display.

FIG. 3 is an illustration of an exemplary presentation of information 250 on display 255. An icon 310 that includes an identity 315 and a face 320 represents each participant in the conference call. Identity 315 would typically be the name of the participant, and face 320 could be a photograph, an icon or a caricature. Additionally, an organizational affiliation 345 and a geographic location 355 further describe the participants. Table 1 provides a set of descriptions for participants 110, 130, 132 and 150.

TABLE 1

| Participant | Site | Name | Organization | Location |
|---|---|---|---|---|
| 110 | 115 | Jones | Verizon | Boston |
| 130 | 135 | Brown | ABC Corp. | Hartford |
| 132 | 135 | Green | ABC Corp. | Hartford |
| 150 | 155 | Smith | Verizon | New York |

On display 255, graphical features such as colors and perimeter lines, and text are used to organize the presentation of information 250, for example to show a relationship between various participants. Referring again to FIG. 3, a perimeter line 350 indicates that Jones is in Boston, a perimeter line 360 indicates that Smith is in New York, and a perimeter line 340 groups Jones and Smith together as being affiliated with Verizon. Also, a perimeter line 385 indicates that Brown and Green are located together in Hartford, and that both are affiliated with ABC Corp. These relationships can be entered via keyboard 265, for example by entering the information into a table such as Table 1.

Additionally, a user can use a graphical editor to manipulate the perimeter lines and move the icons on display 255 by employment of a pointing device such as a mouse (not shown). It allows the user to arrange the perimeter lines and move the icons spatially on display 255 in whatever pattern the user feels is appropriate. For example, members of different companies could be grouped together, and within such groups, members of different departments. The graphical editor allows for indicating group boundaries and relative individual rank and hierarchical relationships, e.g., director, subordinate.

Assume that at an initiation of the conference call display 255 does not yet include a presentation of information. CV 122 is located at site 115, so Jones has access to it. Jones says, "Hello, this is Jones speaking." This dialogue is represented in voice input 220, voiceprint generator 225 generates a voiceprint 230, and organizer 235, in training mode, stores a reference voiceprint to table 240. As organizer 235 does not yet have any additional descriptive information about Jones, reporting module 239 provides a default icon (not shown) to indicate an unknown participant. Subsequently, Jones provides descriptive information, which is stored into table 240 in association with Jones' reference voiceprint. Eventually, each of Brown, Green and Smith speak, and their reference voice prints and descriptive information are also stored into table 240.

Organizer 235 switches to analysis mode, either automatically or under control of Jones. Assume that Smith is now speaking and thus providing a source of voice input 220. Voiceprint generator 225 generates voiceprint 230 in real-time. Matching module 237 searches table 240 and finds a match with the reference voiceprint for Smith. Reporting module 239 obtains information relating to Smith from table 240 and provides information 250 indicative of Smith being the speaker. For example, referring again to FIG. 3, a face 335 for Smith is shown as having an open mouth. However, the indication of a participant speaking can be presented in any convenient manner, e.g., a change in a parameter of an icon, such as intensity, color, size or shape.

Note again that Brown and Green are both located at site 135, in Hartford. Since CV 122 distinguishes participants on a basis of a voiceprint, in a case where either of Brown or Green is speaking, CV 122 indicates which of the two is speaking.

Referring again to FIG. 2, note that there are several alternative features for CV 122. These features relate to operations of a speech processor 275, a library 270, and a log 241.

Speech processor 275 monitors voice input 220 and extracts a syntactical meaning of the dialog contained therein. In turn, it may provide a control 280 to organizer 235 to automate some of the features of CV 122 described above. For example, at the initiation of the conference call, as each of the participants are introducing themselves, speech processor 275 may capture a phrase, "Hello, this is Jones. I'm in Boston." Speech processor 275 issues control 280 to switch organizer 235 into training mode to save a reference voiceprint to table 240 and it provides a description indicating that the reference voiceprint belongs to Jones and that Jones is in Boston. This description is also saved to table 240. Thus, these activities do not need to be controlled manually by a user at keyboard 265.

Speech processor 275 could also include a speech generating capability. Such a capability enables speech processor 275 to act as a coordinator of the conference call, where, at a particular time, it asks each of the participants to introduce themselves and perhaps requests additional information from the participants.

Library 270 is a memory that contains reference voiceprints and descriptive information for potential participants, particularly for people that regularly participate in conference calls. It may also include information that would not ordinarily be readily available, such as a photograph of a participant, which could be presented on display 255 when that participant is speaking. Library 270 may be implemented on a transient storage media, such as a floppy disk, or on a database system to which CV 122 can be connected. In a case where data relating to a participant is available in library 270, the data is downloaded into table 240 at the initiation of the conference call, thus permitting organizer 235 to avoid training for that participant.

Regardless of whether the reference voiceprints in table 240 are developed during a training mode in a current conference call, or downloaded from library 270, it is desirable to refine the reference voiceprint during the course of the conference call based on voiceprints 230 that are acquired by organizer 235 during the conference call. In other words, organizer 235 may concurrently operate in both of its training mode and its analysis mode. If library 270 is available, the refined reference voiceprint and, if desired, new or updated descriptive material, can be saved to library 270.

Also regardless of whether the reference voiceprints in table 240 are developed during a training mode in a current conference call, or downloaded from library 270, it is desirable to limit the number of entries in table 240 to the number of participants in the conference call. This is because, generally, the fewer the number of entries in table 240, the quicker and more accurately matching module 237 will be able to make a match between a real-time voiceprint 230 and a reference voiceprint.

Log 241 is a memory into which information 250 is stored to provide a history of the conference call. The history of the conference call is available as history data 242. History data 242 would be useful in combination with an audio recording for preparation of a transcript or minutes of the conference call.

Figure 4:
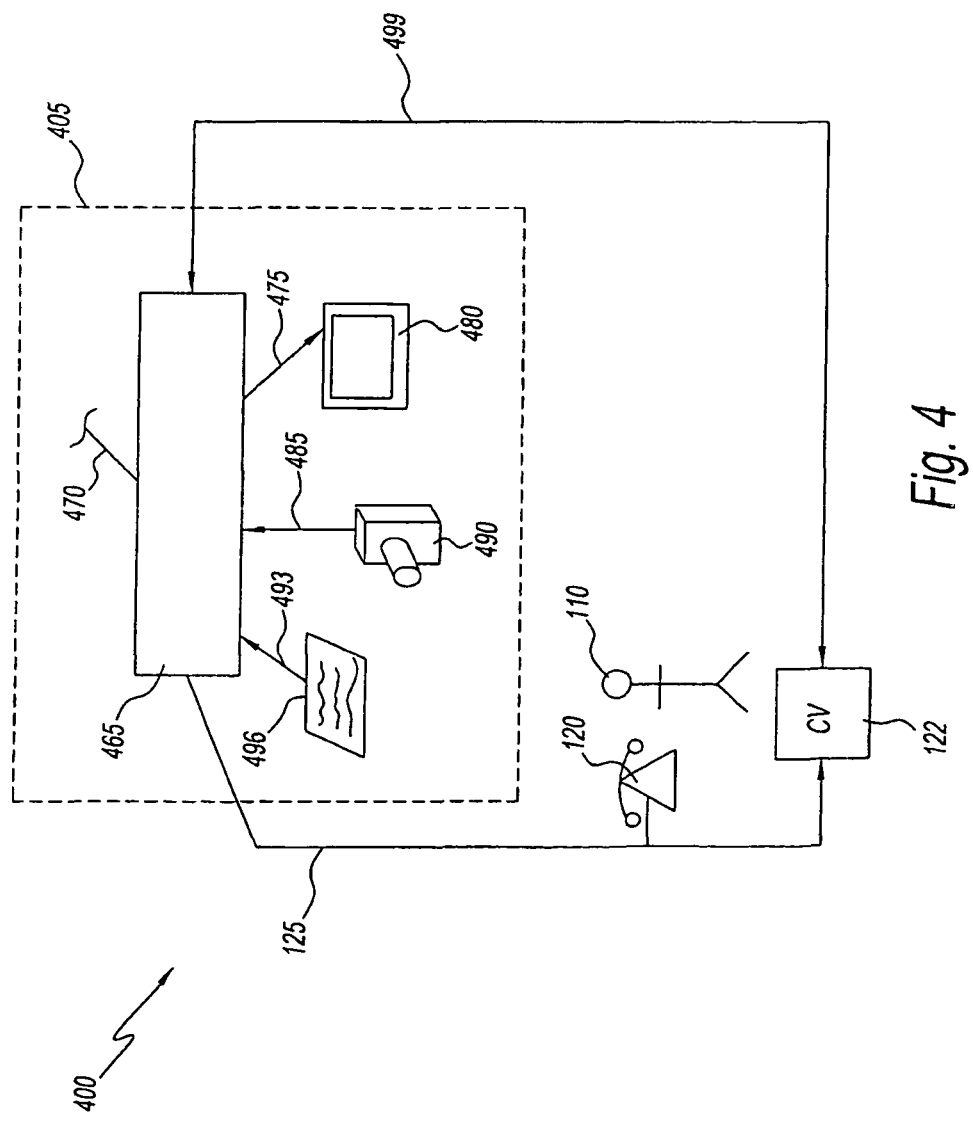
FIG. 4 is a block diagram of a portion of a telecommunications system where a conference visualizer provides information to a video conferencing system.

FIG. 4 is a block diagram of a portion of a telecommunications system 400 where CV 122 provides information 499 to a video conferencing system 405. Information 499, similarly to information 250 as described earlier, is indicative of a participant in a teleconference. Video teleconferencing system 405 includes a controller 465, a keyboard 496, a camera 490 and a video display 480. Video teleconferencing system 405 is coupled to a video conference center (not shown) via a video conference link 470.

Keyboard 496 is an input device that enables participant 110 to enter data and control information 493 into video conferencing system 405. Camera 490 captures images of participant 110 and sends image data 485 to controller 465. Video display 480 receives video information 475 from controller 465 for presentation to participant 110.

Video conference link 470 has both a video channel and an audio channel. The audio channel functions to merge the audio signals of all participants, i.e., participant 110 at the location of video conferencing system 405 and participants at other locations served by the video conference center. The video channel of video conference link 470 typically contains a signal from one of the other active locations at which there is a participant. If there is no active location, the link may contain video signals from more than one location, merged in a manner that can be presented in separate areas of video display 480.

Connection 125 couples telephone 120 and CV 122 to the audio channel of conference link 470. Thus, information 499, which is indicative of which participant is active, can be used by video conference system 405 in conjunction with the video conference center to determine which video signal to display. In addition, descriptive information stored in table 240 and included as a component of information 250 can be obtained by video conference system 405 and the video conference center, and can be presented on video display 480, for example as labels in appropriate video picture areas or in a separate area of display 480 dedicated to a schematic presentation such as shown in FIG. 3.

Link 499 can also carry information from video conferencing system 405 to CV 122, for example to indicate which location has been determined as being active. This information could then be included in a presentation such as shown in FIG. 3. Noted however, that CV 122 can determine whether there is an active participant at a location from which a video picture is not currently displayed.

When information such as shown in FIG. 3 is presented on display 480, it is not necessary for CV 122 to include display 255. Similarly, keyboard 496 of the video conferencing system may be used to perform the functions of keyboard 265.

The integration of CV 122 with video conferencing system 405 is not limited to that illustrated in FIG. 4. For example, link 499 may be omitted leaving connection 125 as the only connection between CV 122 and video conferencing system 405. In this case, video conferencing system 405 can be generic, and the speaker is identified on a display of CV 122, e.g., display 255, as in the embodiment of FIG. 2. A graphical editor could be used on display 255 to place perimeter lines 350, 360, and 385 in relative positions that correspond approximately to the placement on display 480 of the video pictures of Boston, N.Y., and Hartford respectively.

Figure 5:
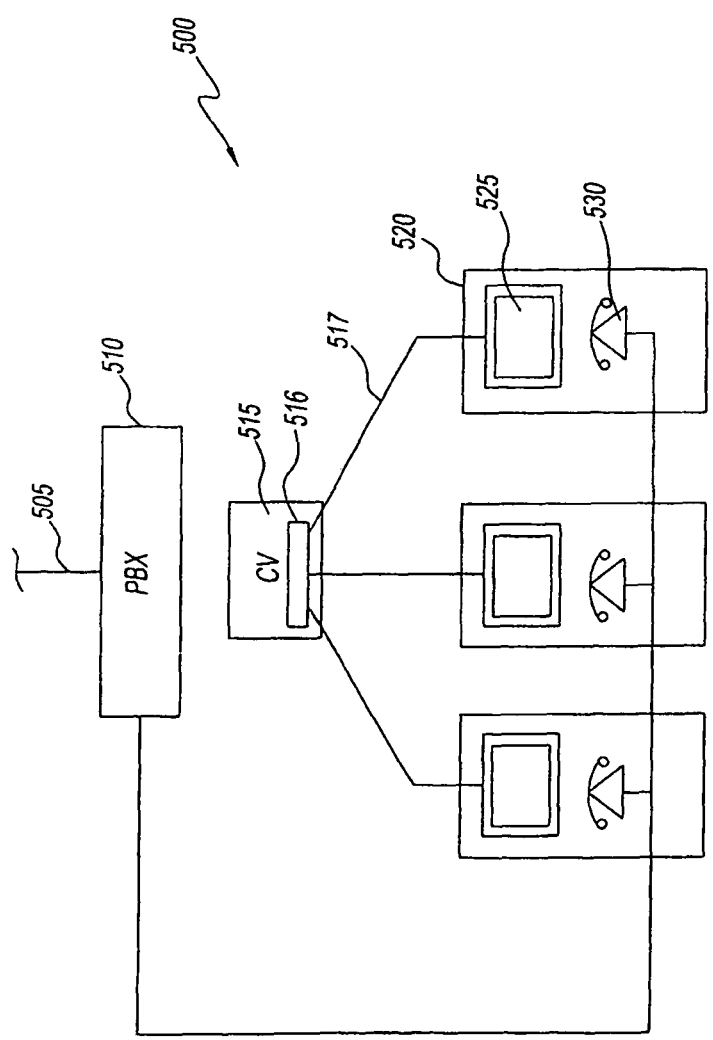
FIG. 5 is a block diagram of a telecommunication system where a conference visualizer is configured for use in a private branch exchange.

FIG. 5 is a block diagram of a telecommunication system 500 where a CV 515 is configured for use in a private branch exchange (PBX). System 500 includes a PBX switch 510, a CV 515, and a plurality of participant stations 520. PBX switch 510 is coupled to a public telephone network (not shown) via a trunk 505. Each of participant stations 520 includes a display 525 and a telephone 530. Telephones 530 and CV 515 are coupled to PBX switch 510. CV 515 includes a distributor 516 through which it selectively provides information 517 to participant stations 520. At least one of participant stations 530 includes a keyboard (not shown in FIG. 5) similar to keyboard 265 so that descriptive information and manual control information can be supplied to CV 515. Other descriptive information, for example telephone numbers, locations, and organizational affiliations of conference participants, can be received by CV 515 from PBX switch 510. Information 517, similarly to information 250, is indicative of a participant in a conference call, and is presented on displays 525 to allow participants to recognize which participant in the conference call is speaking at a particular time. CV 515 is centralized and is thus shared by participant stations 520. CV 515 may contain independent modules separately performing functions similar to those of voiceprint generator 225 and organizer 235 for the different participants.

It should be understood that various alternatives and modifications of the present invention could be devised by those skilled in the art. For example, an embodiment of the present invention can be an add-on stand-alone device that is useable with a variety of conferencing situations, for example, calls set up by calling into a conference bridge, calls set up by adding other phones to an initial two-party call through the use of PBX or a centrex feature, and calls in which there are multiple participants at some locations, using speakerphones. Nevertheless, the present invention is intended to embrace all such alternatives, modifications and variances that fall within the scope of the appended claims.

What is claimed is:

1. A system, comprising:
   a video teleconferencing system having a first link including a video channel and an audio channel,
      said video channel containing video signals sent from multiple locations that are merged in a manner to be presented in separate areas of a video display of the video teleconferencing system if none of said locations are active or that are individually presented in the video display based on an active location determined by a conference visualizer, and
      said audio channel merging audio signals from all conference participants located at said locations;
   the conference visualizer providing information via a second link to said video teleconferencing system indicating the active location, thereby enabling said video teleconferencing system to determine which of said video signals to individually present;
   a first keyboard connected to the conference visualizer to provide input to the conference visualizer; and
   a second keyboard connected to the video teleconferencing system to provide input to said video teleconferencing system;
   wherein the inputs of either keyboard select an operating mode for the conference visualizer.

2. The system of claim 1 further comprising:
   said video teleconferencing system obtaining descriptive information stored in a table in said conference visualizer for presentation on said video display.

3. The system of claim 2 wherein said descriptive information is presented as labels in appropriate video picture areas on said video display.

4. The system of claim 2 wherein said descriptive information is presented as labels in a separate area of said video display dedicated to a schematic presentation.

5. The system of claim 2 wherein said second link is omitted and where said video teleconferencing system and said conference visualizer remain connected only by way of an additional audio channel coupled to the first link,
wherein an active conference participant is identified on a display of the conference visualizer.

6. The system of claim 5 wherein said information includes placement of perimeter lines around various of said conference participants for purposes of visually associating together those of said conference participants within a same one of said perimeter lines.

7. A conference visualizer, comprising:
a voiceprint generator configured to receive voice input from each of a plurality of conference participants and generate a distinguishable voiceprint from said input for each participant, wherein said participants are located at different locations; and
an organizer receiving said voiceprint and configured to operate in a plurality of modes including:
a training mode for receiving and storing a first said voiceprint in a participant table as a reference voiceprint;
an analysis mode for receiving a second said voiceprint and determining if said second said voiceprint matches said reference voiceprint; and
a standby mode in which both the training mode and the analysis mode are disabled upon direction of a local one of said participants co-located with said conference visualizer.

8. The conference visualizer of claim 7 wherein said organizer further comprises:
said table containing a different said first said voiceprint for said each participant; and
a matching module, operative during said analysis mode, for comparing said second said voiceprint against each said different said first said voiceprint to determine a best match.

9. The conference visualizer of claim 8 wherein said organizer further comprises:
a reporting module for providing information, based on said best match, indicative of which one of said participants is speaking.

10. The conference visualizer of claim 8 further comprising:
a keyboard enabling said local participant to provide, define and edit descriptive information about other of said participants and to store in said table said descriptive information corresponding, respectively, to said other of said participants.

11. The conference visualizer of claim 10 wherein said descriptive information is selected from the group of information consisting of a participant's name, a participant's organizational affiliation, a participant's job title and a participant's geographic location.

12. The conference visualizer of claim 10 wherein said local participant manually controls said organizer to be in said training mode to populate said table or in said analysis mode, said local participant basing its mode-choice on observation of which particular said other of said participants is speaking.

13. The conference visualizer of claim 12 wherein said standby mode accommodates conditions when more than one of said participants is speaking concurrently or when a background sound is detected during a period of non-speech.

14. The conference visualizer of claim 9 further comprising:
a display receiving said information from said reporting module, said display showing a representation of said plurality of conference participants including a highlighting of said speaking participant.

15. The conference visualizer of claim 14 wherein said display either highlights said representation corresponding to said speaking participant or shows only said representation of said speaking participant, whereby said local one of said participants recognizes when any of said other of said plurality of conference participants start or stop talking.

16. The system of claim 1 wherein said conference visualizer comprises:
a voiceprint generator configured to receive voice input from each of a plurality of conference participants and generate a distinguishable voiceprint from said input for each participant; and
an organizer receiving said voiceprint and operating according to the operating mode selected by the input of either keyboard,
wherein said operating mode is selected from a list of modes, including:
a training mode for receiving and storing a first said voiceprint in a participant table as a reference voiceprint; and
an analysis mode for receiving a second said voiceprint and determining if said second said voiceprint matches said reference voiceprint.

17. The system of claim 16 wherein said organizer further comprises:
said table containing a different said first said voiceprint for said each participant; and
a matching module, operative during said analysis mode, for comparing said second said voiceprint against each said different said first said voiceprint to determine a best match.

18. The system of claim 17 wherein said organizer further comprises:
a reporting module for providing said information, based on said best match, indicative of which one of said participants is speaking.

19. A system, comprising:
a video teleconferencing system having both a video channel and an audio channel,
said video channel containing either video signals sent from multiple locations and merged in a manner to be presented in separate areas of a video display if none of said locations are active or a video signal sent from an active location at which there is a conference participant, and
said audio channel merging audio signals from all conference participants located at said locations;
a conference visualizer providing information to said video teleconferencing system to indicate which of said participants is active, thereby enabling said video teleconferencing system to determine which of said video signals to present on said video display;
a first keyboard for permitting a first conference participant co-located with said conference visualizer to provide input to a display reflecting audio information;
a second keyboard for permitting said first conference participant to provide input to said video display, wherein said second keyboard may be used to perform functions performed by said first keyboard;

a voiceprint generator configured to receive voice input from each of a plurality of conference participants and generate a distinguishable voiceprint from said input for each participant; and an organizer receiving said voiceprint and configured to operate in:
- a training mode for receiving and storing a first said voiceprint in a participant table as a reference voiceprint,
- an analysis mode for receiving a second said voiceprint and determining if said second said voiceprint matches said reference voiceprint, or
- a standby mode in which both the training mode and the analysis mode are disabled upon direction of a local one of said participants co-located with said conference visualizer.

20. The system of claim 1 wherein said operating mode is selected from a list of modes, including:
- a standby mode in which both a training mode and an analysis mode are disabled upon either keyboard input selecting the standby mode.

\* \* \* \* \*